(No Model.) 2 Sheets—Sheet 1.
M. B. FEENEY.
AUTOMATIC SCREEN OR DOOR FOR OBSTRUCTING THE PASSAGE OF FLAME.
No. 384,141. Patented June 5, 1888.
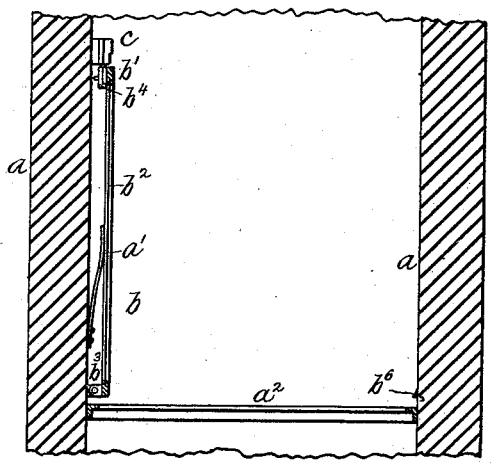
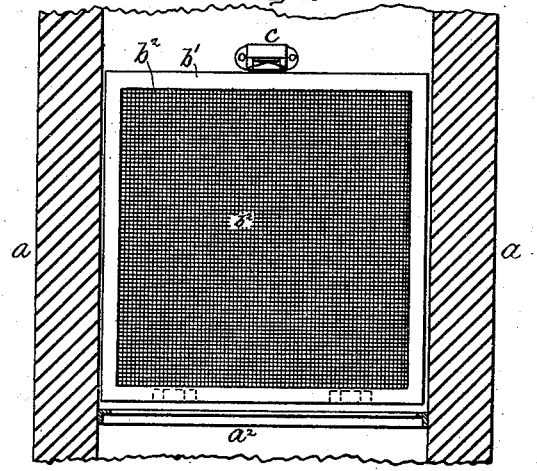
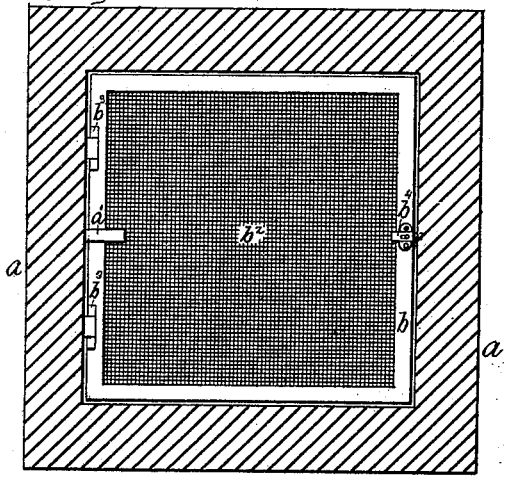
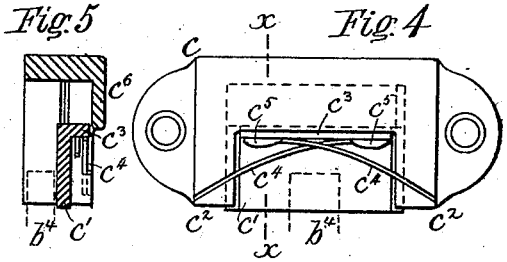
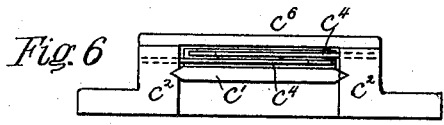
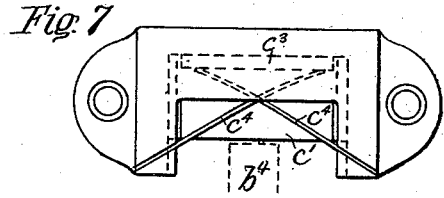
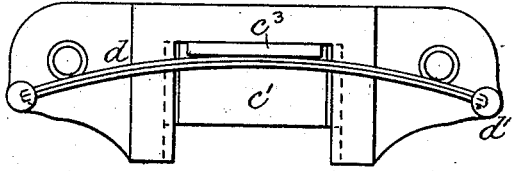
Witnesses.
H. D. Williams.
A. G. Holcombe.
Michael B. Feeney.
Inventor.
per James M. Pully.
Attorney (No Model.) 2 Sheets—Sheet 2.

M. B. FEENEY.
AUTOMATIC SCREEN OR DOOR FOR OBSTRUCTING THE PASSAGE OF FLAME.

No. 384,141. Patented June 5, 1888.

Witnesses
H. D. Williams
A. G. Holcombe

Michael B. Feeney.
Inventor.
per James M. Sully,
Atty.

UNITED STATES PATENT OFFICE.

MICHAEL B. FEENEY, OF NEW YORK, N. Y.

AUTOMATIC SCREEN OR DOOR FOR OBSTRUCTING THE PASSAGE OF FLAME.

SPECIFICATION forming part of Letters Patent No. 384,141, dated June 5, 1888.

Application filed May 26, 1887. Serial No. 239,498. (No model.)

*To all whom it may concern:*

Be it known that I, MICHAEL B. FEENEY, of the city, county, and State of New York, have invented certain new and useful Improvements in Automatic Screens or Doors for Obstructing the Passage of Flame in Shafts and Hoistways, of which the following is a full, clear, and exact description of the same, reference being had to the accompanying drawings, forming a part of this specification.

The object of this invention is to provide means automatically actuated by the heat developed when a building takes fire for closing all openings into and through shafts or hoistways to obstruct the passage of flame; and it comprises a door, screen, or shutter, preferably of wire-gauze, or perforated metal covered with wire-gauze, adapted to be thrown across the shaft or hoistway to separate the different floors, or in front of windows and other openings to isolate the shaft, and held in non-operative position by means of a bolt projecting within a nosing of special construction firmly attached to the wall of the shaft, which releases the bolt upon an abnormal increase of heat. The wire-gauze may be painted with asbestus paint, tungstate of soda, or other non-combustible paint. The nosing is provided with a sliding plate, which is moved back to release the bolt. The sliding plate may be operated by springs, which normally act to move it clear of the bolt, but which are held in compressed position by a solder of fusible metal or an alloy that melts at a low temperature. Where it is deemed advisable to secure direct action upon the sliding plate, a bar composed of two strips of metal having different rates of expansion may be used. Increase of temperature will cause this bar to curve, and thus push the sliding plate back.

But to describe my invention more particularly I will now refer to the accompanying drawings, in which—

Figure 11:
Figure 12:
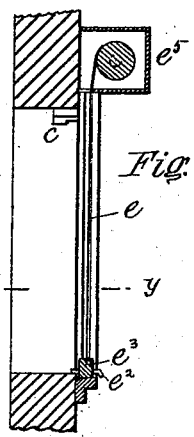
Figure 14:
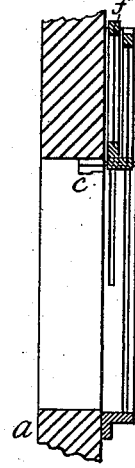
Figure 15:
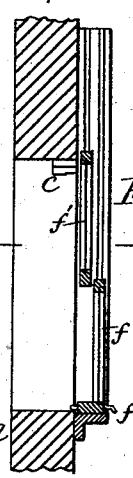
Figure 13:
Figure 16:
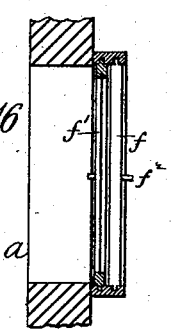
Figure 17:
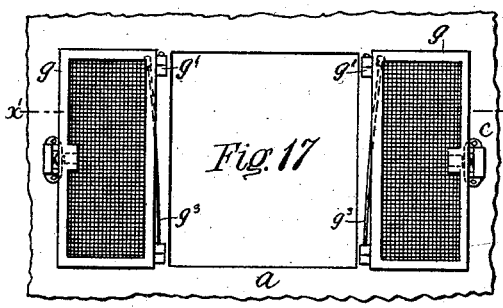
Figure 19:
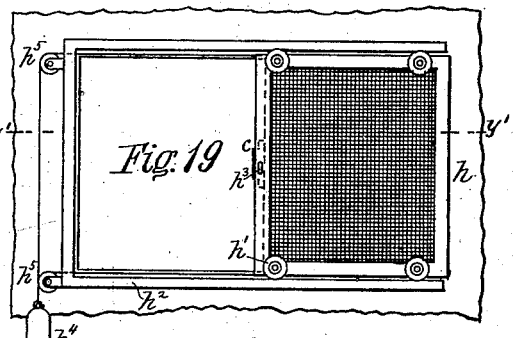
Figure 18:
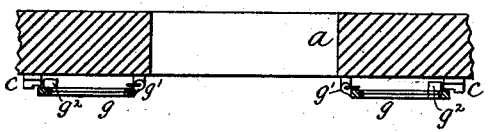
Figure 20:
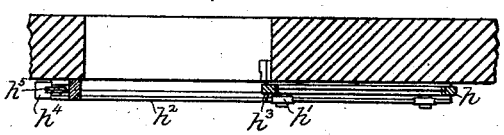

Figure 1 is a vertical section of a portion of a shaft provided with my automatic door held in non-operative position. Fig. 2 is a view taken at right angles to Fig. 1. Fig. 3 is a horizontal section showing the door closed down to obstruct the passage of flame. Fig. 4 is an enlarged front elevation of the nosing, with the sliding plate held in position to retain the bolt by a fusible solder. Fig. 5 is a section of the same on the line $x\ x$. Fig. 6 is an underneath plan view of the same. Fig. 7 is a view similar to Fig. 4, with the sliding plate released and moved back to clear the bolt. Fig. 8 is a front elevation, also enlarged, of a nosing provided with a compound bar in position to retain the bolt. Fig. 9 is an underneath plan view of the same. Fig. 10 is a view similar to Fig. 8, with the sliding plate moved back. Fig. 11 is a sectional view of a window or opening in a wall provided with a rolled screen adapted to close the same and held up by a bolt and my automatic nosing. Fig. 12 is a view similar to Fig. 11, showing the screen lowered, so as to close the window. Fig. 13 is a section of the same on the line $y\ y$. Fig. 14 shows a window, as in Fig. 11, but provided with sliding frames held up by my automatic nosing. Fig. 15 is a view similar to Fig. 14, showing the frames lowered to close the window. Fig. 16 is a section of the same on the line $z\ z$. Fig. 17 is an elevation of a window provided with shutters held open by my automatic nosing. Fig. 18 is a section of the same on the line $x'\ x'$. Fig. 19 shows a window provided with a sliding frame held open by my nosing. Fig. 20 is a section of the same in the line $y'\ y'$.

In Fig. 1, $a\ a$ represent the walls of a light or ventilating shaft of a building. The door $b$ is composed of a metal frame, $b'$, with one or more thicknesses of wire-gauze $b^2$ stretched across it. The mesh of this gauze is of sufficient fineness to effectually obstruct the passage of flame while permitting the escape of heated vapors according to the well-known principle of the safety-lamp. This screen or door is hinged at $b^3$ to the wall of the shaft, and is held up by a bolt, $b^4$, of ordinary construction, projecting within a nosing, $c$. This nosing is clearly illustrated in Figs. 4, 5, 6, and 7, and is provided with a plate, $c'$, sliding in V-shaped grooves in the side posts, $c^2\ c^2$, of the nosing and having a flange, $c^3$. The springs $c^4\ c^4$ are each rigidly secured at one end in one of the posts $c^2\ c^2$ and bear against the flange $c^3$ of the plate $c'$. When free to act, these springs exert pressure against the flange $c^3$ and move the plate $c'$ back to the position shown in Fig. 7; but they are retained under compression by means of a fusible solder, $c^5$, which holds them tightly to the flange $c^3$. The nosing is so constructed that the fusible solder $c^5$ will be exposed to the direct action of the flames in case of fire. A shield, $c^6$, protects the upper parts of the grooves from dust.

The fusible solder may be an alloy of bismuth, lead, and tin, or other metals in various proportions, and can have a melting-point below that of boiling water, so that any abnormal increase of heat will immediately melt it and cause the release of the springs $c^4$ $c^4$. In Fig. 7 this action has taken place and the sliding plate is moved back clear of the end of the bolt $b^4$, indicated by dotted lines.

To insure prompt action of the door $b$ when its bolt has been released by the nosing, it may be so hinged that its center of gravity is considerably beyond its pivotal center, as shown; but as an additional safeguard I prefer to use the flat spring $a'$, one end of which is rigidly secured to the wall $a$, and the other end presses against the door $b$, thus throwing it down with considerable force when released.

To form a support for the screen or door when in closed position, an angle-iron frame, $a^2$, is provided, and to hold the door down its bolt $b^4$ (shown as of the ordinary spring pattern) may be constructed to catch under a piece, $b^6$, projecting from one of the walls $a$.

In Figs. 8, 9, and 10 I have illustrated the application of a compound bar to actuate the sliding plate $c'$. This bar $d$ is composed of two strips of metal having different rates of expansion, as brass and iron firmly secured together. Its ends are sprung into depressions in the posts $d'$, secured to or forming part of the nosing at its extreme ends to allow considerable length to the bar, and it rests against the flange $c^3$ of the sliding plate $c'$. Ordinary variations of temperature will have little effect upon this bar; but any undue increase, as in case of fire, will cause it to curve and push back the plate $c'$, as shown in Fig. 10. In this case the flange $c^3$ projects up entirely clear of the nosing, the shield $c^6$ being omitted.

In Figs. 11, 12, and 13 my improvements are shown applied to a window or opening in a wall, $a$. The rolled screen $e$, preferably of wire-gauze, wound upon the roller $e'$, fitted to rotate freely, is held up by a bolt, $e^2$, fitted in a heavy bar, $e^3$, attached to the lower end of the screen and passing into one of my automatic nosings $c$. This bar $e^3$, the weight of which insures an immediate fall of the screen when released, slides in grooves in the casing $e^4$, so that when it, with the screen, is in lowered position, as shown in Figs. 12 and 13, the opening is perfectly closed. A box, $e^5$, is provided to protect the screen from dust when rolled up.

In Figs. 14, 15, and 16 the closing device is composed of frames, each of which covers a fractional part of the opening or window. In these views two frames, $f$ $f'$, are shown, the lower one, $f$, of which is provided with the bolt $f^2$ projecting within the automtic nosing $c$. This frame has a flange at its lower end which serves to support the upper frame, $f'$, when in non-operative position.

When the windows are to be closed by shutters, the construction shown in Figs. 17 and 18 is adopted. The shutters $g$ $g$ are hinged at $g'$ $g'$ to the wall $a$, and held open by bolts $g^2$ $g^2$ and nosings $c$ $c$. Springs are used to close these shutters when released. Ordinary door-springs, $g^3$ $g^3$, are shown. The bolts are set back, so as not to project beyond the edges of the shutters, thus avoiding interference when closing.

In Figs. 19 and 20 my improvements are applied to a horizontally-sliding frame, $h$, provided with wheels $h'$, fitting over guide-tracks $h^2$, and having a bolt, $h^3$, held by the nosing $c$. The weight $h^4$, connected to the frame $h$ by wire cords passing over pulleys $h^5$, pivoted in the casing, pulls the frame in front of the window to effectually close the same when the automatic nosing releases the bolt.

Having now described my invention, what I claim, and desire to secure by Letters Patent, is—

1. In a device for automatically closing openings into or through shafts or hoistways of buildings to obstruct the passage of flame, in combination, a door, screen, or shutter, a bolt secured thereto, a fixed nosing which receives the end of the bolt, a movable plate in the nosing, and a fusible retaining device, whereby the movable plate of the nosing is caused to release the bolt upon an abnormal increase of heat.

2. In a device for automatically closing openings into or through shafts or hoistways of buildings to obstruct the passage of flame, in combination, a door, screen, or shutter, a bolt secured thereto, a fixed nosing which receives the end of the bolt, a sliding plate in the nosing, springs which press against the sliding plate, and a solder of fusible metal applied to the plate and springs, whereby the springs are released and move the plate back clear of the bolt upon an abnormal increase of heat.

3. In a device for automatically closing openings to obstruct the passage of flame, in combination, a door, screen, or shutter, a bolt secured thereto, a fixed nosing which receives the end of the bolt, and a movable plate or face in the nosing actuated to release the bolt by an abnormal increase of heat.

4. The device comprising the side posts, $c^2$ $c^2$, the sliding plate $c'$, having the flange $c^3$, springs $c^4$ $c^4$, and fusible solder $c^5$ $c^5$, the hinged door $b$, and the bolt $b^4$, secured to the door, substantially as set forth.

MICHAEL B. FEENEY.

Witnesses:
MARGARET M. FEENEY,
MICHAEL J. CANNON.